United States Patent
Glinka

(10) Patent No.: US 9,855,848 B2
(45) Date of Patent: Jan. 2, 2018

(54) CURRENT COLLECTOR FOR A RAIL-MOUNTED VEHICLE

(71) Applicant: SIEMENS AKTIENGESELLSCHAFT, Munich (DE)

(72) Inventor: Martin Glinka, Uttenreuth (DE)

(73) Assignee: Siemens Aktiengesellschaft, Munich (DE)

(*) Notice: Subject to any disclaimer, the term of this patent is extended or adjusted under 35 U.S.C. 154(b) by 194 days.

(21) Appl. No.: 14/436,290

(22) PCT Filed: Oct. 9, 2013

(86) PCT No.: PCT/EP2013/071000
§ 371 (c)(1),
(2) Date: Apr. 16, 2015

(87) PCT Pub. No.: WO2014/060249
PCT Pub. Date: Apr. 24, 2014

(65) Prior Publication Data
US 2015/0283906 A1    Oct. 8, 2015

(30) Foreign Application Priority Data
Oct. 16, 2012   (DE) .................. 10 2012 218 828

(51) Int. Cl.
*B60L 5/22*    (2006.01)

(52) U.S. Cl.
CPC ............. *B60L 5/22* (2013.01); *B60L 2200/26* (2013.01)

(58) Field of Classification Search
CPC ...... B60L 5/00; B60L 5/04; B60L 5/12; B60L 5/18; B60L 5/20; B60L 5/22; B60L 5/24; B60L 5/28; B60L 5/30
See application file for complete search history.

(56) References Cited

U.S. PATENT DOCUMENTS 6,363,862 B1 * 4/2002 Hazard .................. B60L 5/19
105/199.1

FOREIGN PATENT DOCUMENTS

| CA | 2099829 A1 | 1/1994 |
|---|---|---|
| CN | 102458902 A | 5/2012 |
| DE | 718179 C | 3/1942 |
| DE | 69313749 T2 | 1/1998 |
| DE | 19713816 A1 | 10/1998 |
| DE | 102008032588 A1 | 3/2010 |
| EP | 0869029 A2 | 10/1998 |
| GB | 1484955 | 9/1977 |
| JP | S55110013 | 8/1980 |
| JP | 2003023701 A | 1/2003 |
| RU | 58994 U1 | 12/2006 |
| RU | 112106 U1 | 1/2012 |

* cited by examiner

*Primary Examiner* — R. J. McCarry, Jr.
(74) *Attorney, Agent, or Firm* — Laurence A. Greenberg; Werner H. Stemer; Ralph E. Locher

(57) ABSTRACT

A current collector for a rail-mounted vehicle includes a collector arm and an insulation system which has insulating posts for the electrically insulating fastening of the collector arm on a vehicle roof element above an electrically grounded roof surface. In order to achieve a flatter roof structure, the insulation system includes an electrically insulating layer, which is disposed between the roof surface and the collector arm and is spaced apart from the roof surface by an air gap.

15 Claims, 2 Drawing Sheets

CURRENT COLLECTOR FOR A RAIL-MOUNTED VEHICLE

BACKGROUND OF THE INVENTION

Field of the Invention

The invention relates to a current collector for a rail vehicle comprising a collector arm and an insulation system, which has insulating posts for fastening the collector arm in electrically insulating fashion on an electrically grounded vehicle roof element above an electrically grounded roof surface.

Rail vehicles which draw their energy from an electric overhead line have a current collector comprising a collector arm, which is fastened on the vehicle roof. In order to electrically insulate the collector arm and the generally electrically ground vehicle roof, the current collector is provided with an insulation system, which insulates the collector arm from the vehicle roof to a sufficient extent.

In addition to providing insulation, the insulation system also has the task of fastening the collector arm mechanically to the vehicle roof since this fastening also needs to be electrically insulating. For this purpose, the insulation system comprises post insulators, which are used both for insulation and for mechanical fastening of the collector arm on the vehicle roof. Such post insulators are generally plate insulators, which protrude upwards from the electrically grounded vehicle roof and bear a collector arm carrier in the form of a post structure, on which the collector arm is fastened.

In the case of high-speed trains, the collector arm carrier can be a platform, which terminates the vehicle roof at the top. The post insulators are arranged below the platform and therefore within the railcar roof so that as little air resistance as possible is generated during travel of the vehicle. Owing the platform which terminates at the top, an aerodynamic form is achieved.

Precisely in the case of high-speed trains, it is advantageous to configure the trains to be flat overall in order to reduce air resistance. Since this is not intended to have a disadvantageous effect on the standing height within the vehicle, it is advantageous to keep the roof structure as small as possible in terms of its thickness. The thickness of the roof structure is preset, inter alia, by the height of the insulation system.

BRIEF SUMMARY OF THE INVENTION

One object of the present invention consists in specifying a current collector for a rail vehicle which enables a flat roof structure.

This object is achieved by a current collector of the type mentioned at the outset, in which, in accordance with the invention, the insulation system comprises an electrically insulating layer, which is arranged between the roof surface and the collector arm and is spaced apart from the roof surface by an air gap.

The invention is based on the consideration that the previously conventional post insulators need to have a sufficiently large insulation length in order to reliably avoid electrical flashover through the air past the post insulators even in the case of high levels of humidity or rain. Since the electrically grounded vehicle roof is generally arranged below the insulation system, this air flashover path from the grounded roof surface upwards forms the minimum insulation path which is critical for the thickness of the roof structure. The invention is based on the further consideration that a suitable solid insulator provides considerably better electrical insulation than an air layer. If the air layer can be replaced at least partially by a solid insulator, therefore, the flashover path is smaller, with the result that the high-voltage input of the post insulators can also be arranged closer to the electrically grounded vehicle roof element. By virtue of this closer arrangement, the thickness of the roof structure can be reduced.

The insulating posts are expediently those elements which act both as insulators and bear the current collector. The current collector is intended for mounting on the electrically grounded vehicle roof element with its roof surface. The vehicle roof element and with it the roof surface can be, but do not need to be, part of the current collector. However, it is possible for the roof surface to be part of the vehicle roof element, which is part of the current collector. The roof surface can be an outer roof surface or an inner roof surface, which is arranged within the vehicle roof. It expediently forms a closed surface which is water tight with respect to the vehicle interior and in particular is resistant to flashovers with respect to conventional railroad high voltages. Purely theoretically, it is also possible for the roof surface to be an imaginary plane, which is spanned by a plurality of fastening elements of the post insulators.

The insulating layer expediently comprises a layer consisting of an electrically insulating material, advantageously a solid insulator. One or more further layers, for example a UV resistant layer and/or a water-repelling layer, can be provided in addition, wherein the insulating layer expediently completely consists of electrically insulating material.

The electrically insulating layer is advantageously a closed layer, which does not have any openings in its surface at the bottom within its closed surface, apart from water removal sections which may be provided and are formed in a targeted manner. The collector arm can be arranged so as to loop over an overhead line and is expediently in the form of a pantograph.

The insulating layer can be formed as an interlayer between a collector arm carrier and the vehicle roof or form the collector arm carrier itself, so that, in addition to its insulating function, it also has the function of bearing the collector arm.

If the insulating layer is in the form of an interlayer, the insulating posts are expediently post insulators, which can be oriented in particular horizontally. The insulating layer in the form of an interlayer is then arranged between the roof surface and expediently at least in each case one part of the post insulators, with the result that each of the post insulators is arranged at least partially opposite the roof surface in relation to the interlayer, in particular above the insulating layer. Advantageously, the post insulators are arranged completely above the insulating layer, in particular in such a way that a perpendicular shadow of the post insulators falls completely onto the insulating layer. Furthermore, the insulating layer is advantageously closed in the region of the post insulators, i.e. the post insulators and/or also an electrical bushing do not reach through the insulating layer. In the case of an arrangement of the insulating layer between the post insulator and the grounded roof surface, in addition a direct electrically conductive water path between the two voltage potentials can be interrupted.

An advantageous embodiment of the invention provides that the current collector has a collector arm carrier, which is borne by the insulating posts, wherein the electrically insulating layer is an interlayer between the collector arm carrier and the roof surface, which interlayer is mounted so as to be electrically insulating with respect to the collector arm carrier, in particular spaced apart therefrom by an air gap. Owing to the double air layer, a particularly good insulating effect and therefore a flat roof structure can be achieved.

Furthermore, it is advantageous if the insulating layer is in the form of a plate, in particular a self-supporting plate, consisting of at least one electrically insulating material. With the aid of this air layer, the electrical field can be diminished effectively over a small distance owing to the low material-specific dielectric constant of air ($\in_r=1$). A particularly simple and self-supporting insulating structure can be achieved, which is spaced apart from elements arranged above and below. Expediently, the insulating layer is oriented parallel to the roof surface.

If the insulating posts are post insulators, it is advantageous in the case of moist air and in particular also in the case of rain, in order to maintain a high level of insulation effect with respect to the vehicle roof, if in each case one air layer is provided between the post insulators and the insulating layer and between the insulating layer and the electrically grounded roof surface. Water discharged from the insulating layer can be passed over a sufficiently large path, with the result that an electrical flashover over the water path is reliably avoided.

A further advantageous embodiment of the invention provides that the post insulators are each arranged horizontally or at least inclined with respect to the perpendicular. In other words, a straight line between the high-voltage end and the grounding end of a post insulator has a horizontal component. In this way, a compact roof structure can be achieved even in the case of a large insulation length. Expediently, the straight line is inclined through more than 45° with respect to the perpendicular, in particular more than 70°. The perpendicular is expediently perpendicular to the grounded roof surface and/or is arranged in the direction of gravity in the case of a level vehicle. A very compact roof structure can be achieved if the straight line is arranged horizontally. If the post insulators are plate insulators, the straight line expediently runs perpendicular to the plates.

In particular in the case of horizontally oriented post insulators, it is advantageous if the insulating layer is arranged parallel to the post insulators. In this way, a particularly flat roof structure can be produced.

In the case of the presence of a collector arm carrier for supporting the collector arm, it is advantageous if the path between the collector arm carrier and the electrically grounded railcar roof, or the roof surface thereof, is also interrupted by the insulating interlayer. In general terms, it is advantageous if the collector arm is mounted on a collector arm carrier, which is supported by post insulators relative to the vehicle roof, wherein the insulating layer is arranged between the supporting structure and the roof surface. The supporting structure is advantageously arranged between post insulators. It can form an outer roof surface, which contributes to the aerodynamic configuration of the roof, in particular in the case of high-speed trains.

Generally, neither the post insulators nor the post structure are water-tight in such a way that the insulating layer remains dry even in the case of rain falling on the vehicle. In order to avoid flashovers over water bridges, it is therefore advantageous if the insulating layer has a sloping surface, on which water flows away downwards. The slope relates to a horizontal vehicle. The water can be discharged in a targeted manner to a favorable point, so that undesired electrical water bridges are avoided. The entire interlayer, which is in particular in the form of a plate, can be a sloping plane, or only part thereof. A plurality of sloping planes or convex and/or concave surfaces are also possible.

Particularly advantageously, the insulating layer forms an upwardly convex plate. By virtue of the bulbous formation at the top, rain can flow away downwards and to the rim of the insulting layer. Alternatively or in addition, it is possible for the insulating layer to have at least one upwardly concavely shaped region, with a water runoff point being at the lowest point of said region. The water is passed onto this runoff point, which is designed in particular to allow water to be removed in insulating fashion.

A particularly insulating discharge of water can be achieved if the insulating layer has at least one discrete water runoff point. The water runoff point is expediently arranged at a particularly favorable location and/or is embodied in such a way that an electrical water bridge is avoided. The water runoff point can be formed by a concavely curved formation of the insulating layer. As a result, a water channel or a plurality of water channels can be formed, which water channel(s) guide(s) the water in a targeted manner onto the water runoff point. The curvature can be continuous and/or with a bend.

It is furthermore advantageous if the insulating layer has at least one water runoff point, to which a water removal section is connected. The water removal section is expediently designed in such a way that it discharges the water in an electrically favorable manner from the insulating layer, for example directs the water in an outflow direction, for example in a targeted manner in one direction or areally away from the insulating layer. The water removal section can have ribs, which are arranged externally on the insulating layer.

Advantageously, the water removal section is formed from electrically insulating material so that an electrical bridge is avoided.

In addition, it is proposed that the water removal section is longer than the straight path between the insulating layer and the roof surface in the region of the water runoff point. By this means too, an electrical bridge can be counteracted. The length of the water removal section is formed by the flow path of the water on/in the water removal section, for example.

It is furthermore proposed that the insulting layer encloses an air space between it and the roof surface therebelow, and a heater is provided for heating the air space. Snow on the insulating layer can be melted and an insulating effect can be improved. The air space is expediently terminated externally, possibly apart from one or more ventilation openings for feeding and discharging warm air or for dehumidifying the air space. All of the ventilation openings should in this case have in total a cross section of below 1/20, in particular below 1/50, of the surface of the insulating layer.

BRIEF DESCRIPTION OF THE SEVERAL VIEWS OF THE DRAWING

The above-described properties, features and advantages of this invention and the way in which they are achieved will become clearer and more easily understandable in connection with the description below of the exemplary embodiments, which will be explained in more detail in connection with the drawings, in which.

DESCRIPTION OF THE INVENTION

Figure 1:
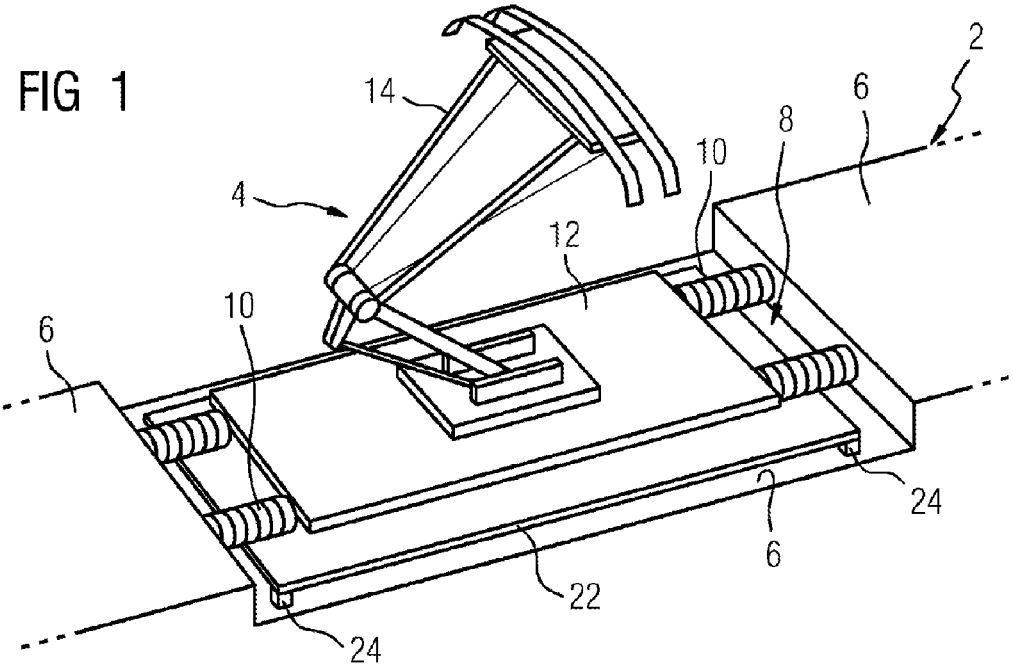
FIG. 1 shows a current collector on the vehicle roof of a locomotive of a rail vehicle in a perspective view at an angle from above.

FIG. 1 shows a perspective view at an angle from above of a vehicle roof element 2 of a vehicle roof of a locomotive of a rail vehicle, in which a current collector 4 is installed. The vehicle roof element 2 has an electrically grounded roof surface 6, which has a depression 8 in the region of the current collector 4. The current collector 4 is located in this depression 8 and is fastened to the vehicle roof element 2 via four post insulators 10. The post insulators 10 bear a collector arm carrier 12, which is expediently electrically conductive. In this exemplary embodiment, the collector arm carrier 12 is in the form of a platform, on which the collector arm 14 of the current collector 4 is fitted. The collector arm carrier 12 is supported relative to the vehicle roof element 2 by the post insulators 10. It forms an outer roof surface, which contributes to the aerodynamic configuration of the vehicle roof 2. During travel, the collector arm 14 is in electrical contact with an overhead line (not illustrated) for current tapping and for energy consumption for driving the rail vehicle.

The collector arm 14 is provided at the top with two bows for looping onto an overhead line of a railroad network and for tapping of the railroad mains voltage. The collector arm 14 is connected to the traction components and auxiliary power supplies of the rail vehicle via an electrical connection. This electrical connection can be in the form of a cable link comprising a plug connector or cable sealing end on the current collector.

The post insulators 10 are plate insulators, which are not arranged perpendicularly between the collector arm carrier 12 and the roof surface 6 in the depression 8, as is conventional, but bear the collector arm carrier 12 between them. For this purpose, the post insulators 10 can be arranged horizontally or at an angle, so that a straight line between the high-voltage end and the grounding end runs horizontally or at an angle to the vertical. The collector arm carrier 12 does not need to be plate-shaped as in this exemplary embodiment, but can also be constructed from struts or have another suitable shape.

Figure 2:
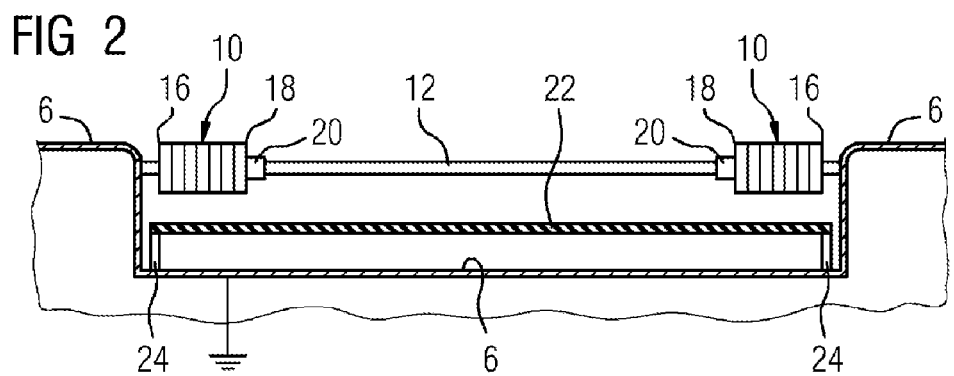
FIG. 2 shows the insulation system of the current collector comprising an insulating layer beneath post insulators.

The horizontal arrangement can be seen in FIGS. 1 and 2, wherein FIG. 2 shows the current collector 4 in a schematic lateral illustration. The collector arm 14 is not illustrated in FIG. 2 for reasons of clarity. The post insulators 10 are arranged with their grounding end 16, i.e. the grounded end or the end of the low potential, on the roof surface 6 and are fastened with this end to the vehicle roof element 2. The current collector 4 is fastened on the high-voltage end 18, said current collector resting on the collector arm carrier 12, for example, which is fastened at the high-voltage end 18, in this exemplary embodiment via a fastening element 20.

An electrically insulating interlayer 22 consisting of a solid insulator is arranged between the roof surface 6 in the depression 8 and the post insulators 10. The insulating layer 22 is in the form a plate, which is fastened at the front and at the rear on the roof surface 6 or the vehicle roof element 2 via posts 24 in the form of perpendicular side walls. By virtue of this arrangement, the high-voltage end 18 of each post insulator 10 is separated from the roof surface 6 by the insulating layer 22. In other words: the insulating layer 22 is arranged between the high-voltage ends 18 of the post insulators 10 and the roof surface 6. The arrangement is such that the shortest line between the high-voltage end 18 and the roof surface 6 passes through the insulating layer 22.

Not only the high-voltage end 18 but the majority of each post insulator 10 is separated from the roof surface 6 by the insulating layer 22, with the result that a direct electrical flashover from the high-voltage end 18 and the majority of the post insulator 10 onto the roof surface 6 is suppressed. The collector arm carrier 12, which is kept at the voltage level of the overhead line or the collector arm 14 during operation of the rail vehicle, is separated from the roof surface 6 over its entire surface by the insulating layer 22, i.e. the insulating layer 22 is arranged completely beneath the entire collector arm carrier 12.

The insulating layer 22 is arranged parallel to the post insulators 10, wherein the direction of arrangement of the post insulators 10 is formed by an imaginary straight line between the high-voltage end 18 and the grounding end 16. In each case one air layer is provided between the post insulators 10 and the insulating layer 22 and also between the insulating layer 22 and the electrically grounded roof surface.

During travel of the rail vehicle, both the collector arm carrier 12 and the insulating layer 22 are exposed to rain, so that water can accumulate on the insulating layer 22. This water forms an electrically conductive layer, which produces undesired contact with the ground potential of the roof surface in the case of an unsuitable flow away towards the roof surface 6 and therefore brings this ground potential into a region which is undesirably close to the post insulators 10, in particular to the high-voltage end 18 thereof.

Figure 3:
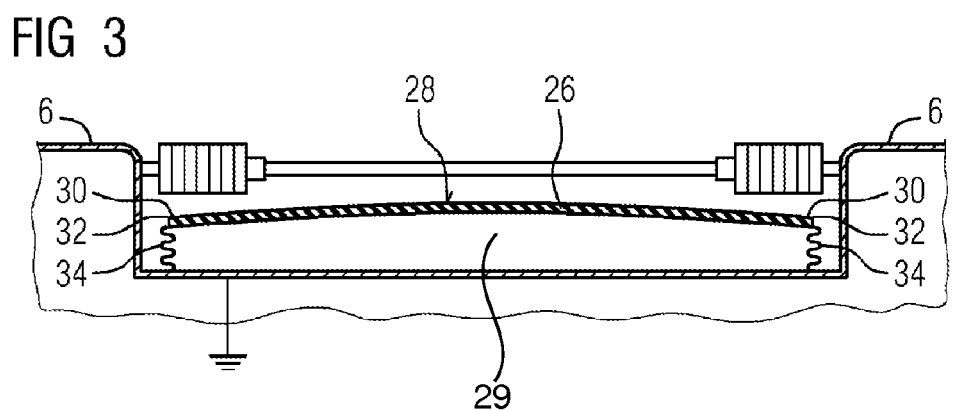
FIG. 3 shows an alternative and upwardly convexly curved interlayer having lateral ribs.

One possibility for removing the water in a targeted manner and suppressing undesired water bridges is illustrated in FIG. 3.

FIG. 3 shows an alternative interlayer 26 on the roof surface 6 of the vehicle roof 2. The descriptions below relating to the exemplary embodiments shown in the following figures are restricted substantially to the difference in respect of the exemplary embodiments in FIGS. 1 and 2, to which reference is made as regards features and functions which remain the same. Component parts which substantially remain the same are in principle denoted by the same reference symbols and features which are not mentioned are carried over to the following exemplary embodiments without being described again.

The insulating layer 26 shown in FIG. 3 is a plate consisting of a solid insulator, in the same way as the insulating layer 22, but this plate is not flat, but has an upwardly convexly curved surface 28, for example an upper, straight apex line or first line and two lower gutter lines 30. The surface 28 of the insulating layer 6 is thus angled on both sides so that the water flows away downwards on both sides from the first line to the two gutter lines 30. Instead of the straight first line, a two-dimensional curvature, such as a surface of a section of a sphere or another body of revolution with a vertical axis of rotation, is also possible.

In the exemplary embodiment shown in FIG. 3, the water is passed to the two gutter lines 30, which form a water runoff point 32, at which the water leaves the insulating layer 26. The two water runoff points 32 are linear.

The two water runoff points 32 are arranged relatively tightly against the roof surface 6. If, for example, as a result of snow fall or the formation of ice between the insulating layer 26 and the collector arm carrier 12 which bears the collector arm 26, a path with a low electrical resistance should form between the collector arm carrier 12 and the insulating layer 26, care should be taken to ensure that no short circuit is produced as a result of flowing water from the insulating layer 26 onto the roof surface therebeneath of the vehicle roof.

Since the path from the water runoff points 32 to the roof surface 6 is too short to reliably avoid a water, snow or ice bridge with a low electrical resistance, in each case one water removal section 34 is arranged at the water runoff points 32. In this exemplary embodiment, the water removal sections 34 are in the form of longitudinal ribs, which at the same time form the posts for the insulating layer and are corrugated in this exemplary embodiment. Owing to the corrugated form or ribbed form, the path along which the water flows from the top to the bottom along the ribs at the rib-shaped water removal section 34 is longer than the imaginary shortest straight path between the water runoff point 32 and the roof surface 6. As a result, the distance of the path of the water at the water removal section 34 is extended to such an extent that the formation of electrical bridges is safely avoided. The water removal section 34 is formed from a solid insulator, as is the case for the insulating layer 26. It is in the form of a circumferential side wall between the roof surface 6 and the insulating layer 26, with the result that water running off from the insulating layer must flow away on each of the four sides on the rib form. Owing to the circumferential termination of the insulating layer 26 with the water removal section 34, a closed air space 29 is formed between the insulating layer 26 and the roof surface 6. This air space can be heated by supplying warm air or by a heated roof surface 6. As a result, indirect heating of the insulating layer 26 is possible. With the aid of a heated interlayer 26, ice and snow on the insulating layer 26 can be melted and can flow away in the form of water.

Owing to the short path between the insulating layer 26 and the roof structure there beneath, or the roof surface 6, it may furthermore be advantageous to restrict the water runoff from the insulating layer 26 to a few in particular discrete points. At these water runoff points, further measures for avoiding short circuits can be taken. Correspondingly, the insulating layer 26 is expediently shaped in such a way that the water flows away at individual water runoff points provided specially for this purpose. Such a water runoff point can be within the insulating layer 26, as is indicated in FIG. 4.

Figure 4:
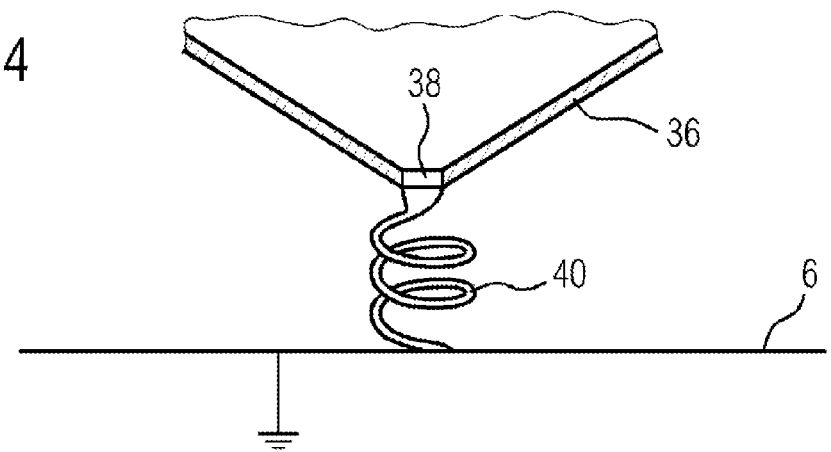
FIG. 4 shows a detail of a further upwardly concavely shaped interlayer comprising an inner water runoff point and a water removal section connected thereto.

FIG. 4 shows a further exemplary embodiment of an insulating layer 36 for arrangement between the roof surface 6 and the collector arm carrier 12 (not illustrated). The insulating layer 36 is illustrated in section form and only in detail and is concavely curved at the top, for example in the form of a funnel, so that the water runs to the lowest point in the concave form. At this point, a water runoff point 38 in the form of an opening is arranged in the insulating layer 36. The water runoff point 38 is arranged particularly tightly against the roof surface 6, but a water removal section 40 is connected to the water runoff point 38, which water removal section extends the path of the water from the water runoff point 38 to the roof surface 6 by virtue of it guiding the water path with respect to the straight and shortest path between the water runoff point and the roof surface 6. In FIG. 4, the water removal section 40 is in the form of a spiral coil, wherein other suitable forms can also be advantageous for extending the water path. The water removal section 40 is formed from a solid insulator in the form of a channel or closed tube, so that a flashover from a coil to the adjacent coil is prevented. The length of the water removal section is formed by the flow path of the water at or in the water removal section.

Figure 5:
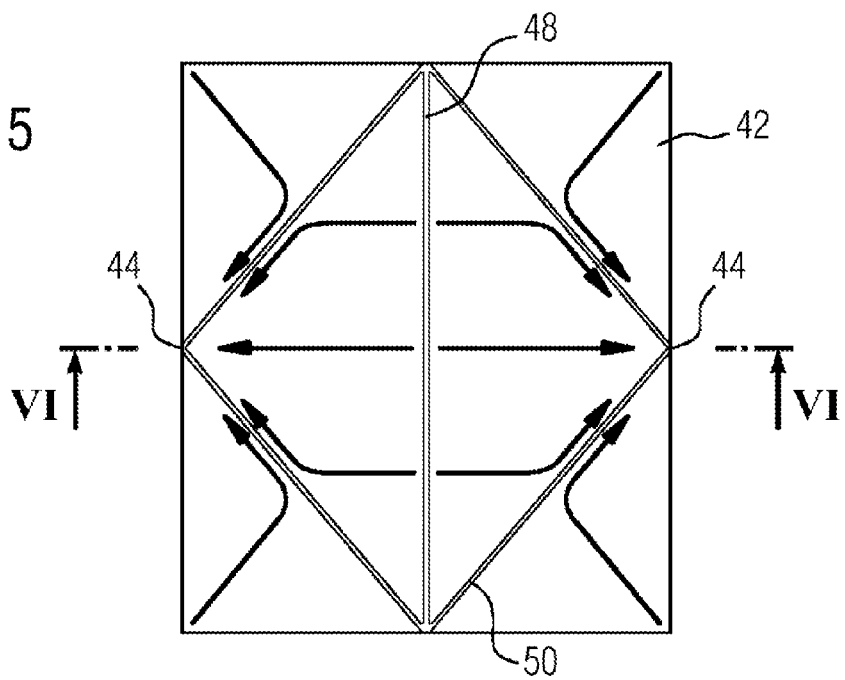
FIG. 5 shows a concavely and convexly curved interlayer in a view from above.
Figure 6:
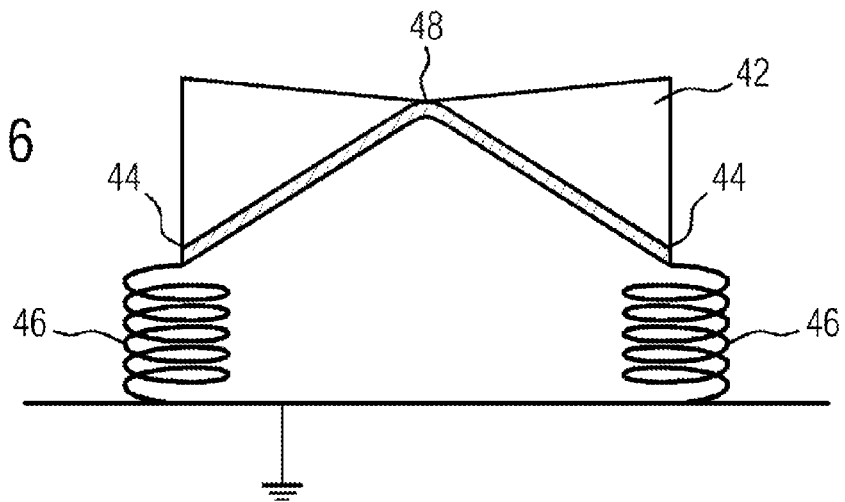
FIG. 6 shows a schematic sectional illustration through the insulating layer shown in FIG. 5 comprising two water removal sections.

A further embodiment of an insulating layer 42 comprising water runoff points 44 and water removal sections 46 connected thereto is shown in FIGS. 5 and 6. FIG. 5 shows the insulating layer 42 from above, whereas FIG. 6 shows a schematic section through the insulating layer 42 along the line VI-VI. The insulating layer 42 is upwardly convexly curved with an upper first line 48. Owing to the bent curvature, channels 50 are produced which each lead to a water runoff point 44. Paths of the water flowing from the first line 48 or the rims of the insulating layer 42 to the water runoff points 44 are illustrated by arrows in FIGS. 5 and 6. The water removal sections 46 are configured analogously to the water removal section 40 in FIG. 4, wherein other embodiments extending the water path can also be advantageous.

Although the invention has been illustrated and described in more detail using the preferred exemplary embodiments, the invention is not restricted by the disclosed examples and other variations can be derived herefrom by a person skilled in the art without departing from the scope of protection of the invention.

The invention claimed is:

1. A current collector for a rail vehicle, the current collector comprising:
    a collector arm;
    an insulation system;
    said insulation system having insulating posts constructed as post insulators fastening said collector arm in an electrically insulating manner on a vehicle roof element above an electrically grounded roof surface;
    said post insulators each having a high-voltage end and a grounding end, and said post insulators each defining a straight line between said ends having a horizontal component;
    said insulation system having an electrically insulating layer disposed between the roof surface and said collector arm and spaced apart from the roof surface by an air gap; and
    air-filled layers respectively provided between said post insulators and said insulating layer.

2. The current collector according to claim 1, which further comprises:
    a collector arm carrier carried by said insulating posts;
    said electrically insulating layer being an interlayer between said collector arm carrier and the roof surface, said electrically insulating layer being mounted so as to be electrically insulated from said collector arm carrier.

3. The current collector according to claim 1, wherein:
    a collector arm carrier is supported relative to the vehicle roof by said post insulators;
    said collector arm is mounted on said collector arm carrier; and
    said insulating layer is disposed between said collector arm carrier and the roof surface.

4. The current collector according to claim 1, wherein said insulating layer is a solid insulator.

5. A current collector for a rail vehicle, the current collector comprising:
    a collector arm;
    an insulation system;
    said insulation system having insulating posts constructed as post insulators fastening said collector arm in an electrically insulating manner on a vehicle roof element above an electrically grounded roof surface; and said insulation system having an electrically insulating layer disposed between the roof surface and said collector arm and spaced apart from the roof surface by an air gap, said insulating layer being disposed parallel to said post insulators; and air-filled layers respectively provided between said post insulators and said insulating layer.

6. The current collector according to claim 5, wherein said insulating layer is a solid insulator.

7. The current collector according to claim 5, which further comprises:

a collector arm carrier carried by said insulating posts;

said electrically insulating layer being an interlayer between said collector arm carrier and the roof surface, said electrically insulating layer being mounted so as to be electrically insulated from said collector arm carrier.

8. The current collector according to claim 5, wherein:

a collector arm carrier is supported relative to the vehicle roof by said post insulators;

said collector arm is mounted on said collector arm carrier; and said insulating layer is disposed between said collector arm carrier and the roof surface.

9. A current collector for a rail vehicle, the current collector comprising:

a collector arm;

an insulation system;

said insulation system having insulating posts fastening said collector arm in an electrically insulating manner on a vehicle roof element above an electrically grounded roof surface; and said insulation system having an electrically insulating layer disposed between the roof surface and said collector arm and spaced apart from the roof surface by an air gap, said insulating layer having a sloping surface on which water flows away downwards.

10. A current collector for a rail vehicle, the current collector comprising:

a collector arm;

an insulation system;

said insulation system having insulating posts fastening said collector arm in an electrically insulating manner on a vehicle roof element above an electrically grounded roof surface; and said insulation system having an electrically insulating layer disposed between the roof surface and said collector arm and spaced apart from the roof surface by an air gap, said insulating layer having at least one upwardly concavely shaped region with a lowest point and a water runoff point disposed at said lowest point.

11. A current collector for a rail vehicle, the current collector comprising:

a collector arm;

an insulation system;

said insulation system having insulating posts fastening said collector arm in an electrically insulating manner on a vehicle roof element above an electrically grounded roof surface; and said insulation system having an electrically insulating layer disposed between the roof surface and said collector arm and spaced apart from the roof surface by an air gap, said insulating layer having at least one discrete water runoff point is formed by a concavely curved shape of said insulating layer.

12. A current collector for a rail vehicle, the current collector comprising:

a collector arm;

an insulation system;

said insulation system having insulating posts fastening said collector arm in an electrically insulating manner on a vehicle roof element above an electrically grounded roof surface; and said insulation system having an electrically insulating layer disposed between the roof surface and said collector arm and spaced apart from the roof surface by an air gap, said insulating layer having at least one water runoff point, and a water removal section connected to said at least one water runoff point.

13. The current collector according to claim 12, wherein said water removal section is formed of electrically insulating material.

14. The current collector according to claim 12, wherein said insulating layer and the roof surface define a straight section, and said water removal section is longer than said straight section in the vicinity of said at least one water runoff point.

15. A current collector for a rail vehicle, the current collector comprising:

a collector arm;

an insulation system;

said insulation system having insulating posts fastening said collector arm in an electrically insulating manner on a vehicle roof element above an electrically grounded roof surface;

said insulation system having an electrically insulating layer disposed between the roof surface and said collector arm and spaced apart from the roof surface by an air gap, said insulating layer enclosing an air space between said insulating layer and the roof surface below said insulating layer; and a heater provided for heating the air space.

* * * * *